(12) United States Patent
Goebuchi

(10) Patent No.: US 7,880,129 B2
(45) Date of Patent: Feb. 1, 2011

(54) LIGHT RECEIVING CIRCUIT, LIGHT RECEIVING METHOD, AND STORAGE MEDIUM

(75) Inventor: Yuta Goebuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 45 days.

(21) Appl. No.: 12/490,571

(22) Filed: Jun. 24, 2009

(65) Prior Publication Data

US 2009/0322381 A1    Dec. 31, 2009

(30) Foreign Application Priority Data

Jun. 30, 2008    (JP) .............................. 2008-169866

(51) Int. Cl.
*G01J 1/44* (2006.01)
*H01L 31/00* (2006.01)

(52) U.S. Cl. ................. 250/214 R; 250/214.1

(58) Field of Classification Search ............. 250/214 R, 250/214.1, 214 A, 214 LA; 327/59, 62, 73; 377/24, 28; 369/47.27, 100; 356/369; 348/77
See application file for complete search history.

(56) References Cited

FOREIGN PATENT DOCUMENTS

JP    2003198475 A    7/2003

*Primary Examiner*—Que T Le
*Assistant Examiner*—Don Williams

(57) ABSTRACT

The PD converts the light into a current signal and supplies the converted a current signal to a TIA and a light intensity measuring unit. The TIA converts the current signal into a voltage signal. The CDR circuit identifies whether the voltage signal is 1 data or 0 data for reproduction. The counter counts the 1 data and 0 data, calculates their ratio. The control unit refers to light intensity data from the light intensity measuring unit and a ROM, acquires an optimum ratio, and determines whether the ratio supplied from the counter is the optimum ratio. When the ratio is not the optimum one, the control unit controls the threshold voltage setting unit to set the threshold voltage so that the ratio is the optimum one.

12 Claims, 15 Drawing Sheets

| RECEIVED LIGHT INTENSITY(dBm) | OPTIMUM RATIO |
|---|---|
| 0 | 1.23 |
| −3 | 2.34 |
| −6 | 2.45 |
| −9 | 3.55 |
| −12 | 5.86 |

| WAVELENGTH DISPERSION(ps/nm) | OPTIMUM RATIO |
|---|---|
| −500 | 5.38 |
| −250 | 3.22 |
| 0 | 2.69 |
| 250 | 1.30 |
| 500 | 1.01 |

LIGHT RECEIVING CIRCUIT, LIGHT RECEIVING METHOD, AND STORAGE MEDIUM

INCORPORATION BY REFERENCE

This application is based on Japanese Patent Application No. 2008-169866 filed on Jun. 30, 2008 and including specification, claims, drawings and summary. The disclosure of the above Japanese Patent Application is incorporated herein by reference in its entirety.

TECHNICAL FIELD

The present invention relates to a light receiving circuit, a light receiving method, and a storage medium.

BACKGROUND ART

A light receiving circuit, which is widely used in optical communication systems, includes an identifying and reproducing circuit that identifies and reproduces received light. First the identifying and reproducing circuit determines whether an amplitude of the pulse waveform of an electric signal into which an optical signal has been converted is greater or smaller than a specified threshold value (hereinafter referred to as the "threshold"). When the amplitude is smaller than the threshold, the identifying and reproducing circuit determines it as "0". When greater than the threshold, the circuit determines it as "1". Then the circuit reproduces a data signal indicating "0" (hereinafter referred to as "0 data") or a data signal indicating "1" (hereinafter referred to as "1 data") and output the data.

In general, data used by digital optical transmission systems of the backbone system are scrambled. Thus, the ratio of 1 data identified and reproduced by the identifying and reproducing circuit to 0 data identified and reproduced thereby is 1:1.

Unexamined Japanese Patent Application KOKAI Publications No. 2003-198475 (hereinafter referred to as "Patent Literature 1") discloses a light receiving device including an identifying and reproducing circuit that uses the characteristics of scrambled digital data (pages 3 and 4 and FIG. 1).

The light receiving device as disclosed in Patent Literature 1 includes an identification threshold correction circuit. This identification threshold correction circuit corrects the threshold voltage set to the identifying and reproducing circuit so that the ratio of 1 data reproduced by the identifying and reproducing circuit to 0 data reproduced thereby is 1:1.

The waveform of an electric signal supplied to the identifying and reproducing circuit is not an ideal pulse waveform. It is distorted by noise caused by a photodiode, etc. Even when the threshold voltage is set so that the ratio of 1 data to 0 data is 1:1, the BER (Bit Error Rate) eventually increases to a level where it is not practically usable. The BER changes according to the intensity of light received by a light receiving circuit, waveform distortions thereof, and the like.

For example, a light receiving circuit including a photodiode and an amplifier with a high OSNR (optical signal-to-noise ratio) is used to receive an optical signal without waveform distortions. In this example, a heat noise of the amplifier is much greater than a shot noise generated by the photodiode. In this case, when the threshold voltage is set to a value in the neighborhood of the midpoint between the 0 and 1 levels of the eye pattern indicated by the waveforms of the electric signal, the ratio of 1 data to 0 data is 1:1.

Meanwhile, when the light intensity of the optical signal is high, the shot noise caused by the light receiving element is much greater than the heat noise generated by the amplifier. Therefore, the noise is greater at the 1 level of the eye pattern indicated by signal waveforms. When the threshold voltage is set to a value in the neighborhood of the 0 level of the eye pattern, the ratio of 1 data to 0 data is considered to be 1:1. However, the BER is adequately small even when the threshold voltage is set to a value in the neighborhood of the 1 level. Therefore, the receiving performance is satisfactory when the threshold voltage is set to a value in the neighborhood of the midpoint of the eye pattern.

The BER changes not only according to the light intensity of an optical signal, but also according to, e.g., waveform distortions due to the wavelength dispersion of an optical signal.

Again, the BER changes according to the light intensity or wavelength dispersion of an optical signal, or the like. The optimum threshold voltage as well changes according to the light intensity of optical signals, etc. However, the light receiving device as disclosed in Patent Literature 1 does not address the intensity of received light and the like.

SUMMARY

The present invention is made to solve the above problem. The present invention is directed to providing a light receiving circuit, a light receiving method, and a storage medium that can adjust the threshold voltage according to optical signals.

To achieve the above exemplary object, the light receiving circuit according to a first exemplary aspect of the present invention includes:

a converting unit that converts an optical signal into an electric signal;

a measuring unit that measures a specified physical quantity of the optical signal;

a generating unit that binarizes a signal level of the electrical signal into a first value or a second value based on a specified threshold and generates a data signal that indicates a binarized value;

a ratio acquiring unit that calculates a ratio of a period in which the first value is indicated by the data signal generated by the generating unit to a period in which the second value is indicated thereby;

a threshold setting unit that sets the threshold;

a storing unit that in advance stores information on a relationship among the physical quantity measured by the measuring unit, the ratio calculated by the ratio acquiring unit, and a bit error rate of the data signal generated by the generating unit; and a control unit that controls the threshold setting unit to change the threshold based on the information stored in the storing unit, the physical quantity measured by the measuring unit, and the ratio calculated by the ratio acquiring unit so that the bit error rate of the data signal generated by the generating unit is low.

To achieve the above exemplary object, the light receiving circuit according to a second exemplary aspect of the present invention includes:

converting means that converts an optical signal into an electric signal;

measuring means that measures a specified physical quantity of the optical signal;

generating means that binarizes a signal level of the electrical signal into a first value or a second value based on a specified threshold and generates a data signal that indicates a binarized value;

ratio acquiring means that calculates a ratio of a period in which the first value is indicated by the data signal generated by the generating means to a period in which the second value is indicated thereby;

threshold setting means that sets the threshold;

storing means that in advance stores information on a relationship among the physical quantity measured by the measuring means, the ratio calculated by the ratio acquisition means, and a bit error rate of the data signal generated by the generating means; and control means that controls the threshold setting means to change the threshold based on the information stored in the storing means, the physical quantity measured by the measuring means, and the ratio calculated by the ratio acquiring means so that the bit error rate of the data signal generated by the generating means is low.

The light receiving method according to a third exemplary aspect of the present invention is performed by a light receiving circuit including a converting unit, a measuring unit, a generating unit, a ratio acquiring unit, a threshold setting unit, a storing unit, and a control unit, the storing unit in advance storing information on a relationship among a physical quantity measured by the measuring unit, a ratio calculated by the ratio acquiring unit, and a bit error rate of a data signal generated by the generating unit, and the method includes:

a converting step of, by the converting unit, converting an optical signal into an electric signal;

a measuring step of, by the measuring unit, measuring the specified physical quantity of the optical signal;

a generating step of, by the generating unit, binarizing a signal level of the electrical signal into a first value or a second value based on a specified threshold and generating a data signal that indicates a binarized value;

a ratio acquiring step of, by the ratio acquiring unit, calculating a ratio of a period in which the first value is indicated by the data signal generated by the generating unit to a period in which the second value is indicated thereby;

a threshold setting step of, by the threshold setting unit, setting the threshold; and a controlling step of, by the control unit, controlling the threshold setting unit to change the threshold based on the information stored in the storing unit, the physical quantity measured by the measuring unit, and the ratio calculated by the ratio acquiring unit so that the bit error rate of the data signal generated by the generating unit is low.

A storage medium according to a fourth exemplary aspect of the present invention storing a program that causes a computer to act as a light receiving circuit, the light receiving circuit including:

a converting unit that converts an optical signal into an electric signal;

a measuring unit that measures a specified physical quantity of the optical signal;

a generating unit that binarizes a signal level of the electrical signal into a first value or a second value based on a specified threshold and generates a data signal that indicates a binarized value;

a ratio acquiring unit that calculates a ratio of a period in which the first value is indicated by the data signal generated by the generating unit to a period in which the second value is indicated thereby;

a threshold setting unit that sets the threshold;

a storing unit that in advance stores information on a relationship among the physical quantity measured by the measuring unit, the ratio calculated by the ratio acquiring unit, and a bit error rate of the data signal generated by the generating unit; and a control unit that controls the threshold setting unit to change the threshold based on the information stored in the storing unit, the physical quantity measured by the measuring unit, and the ratio calculated by the ratio acquiring unit so that the bit error rate of the data signal generated by the generating unit is low.

According to the present invention, a light receiving circuit, a light receiving method and a storage medium that can adjust the threshold voltage according to an optical signal can be provided.

BRIEF DESCRIPTION OF THE DRAWINGS

FIG. 3A shows a table presenting example corresponding data of light intensity and optimum ratio, and FIG. 3B shows a table presenting example corresponding data of wavelength dispersion and optimum ratio.

EXEMPLARY EMBODIMENT

Figure 1:
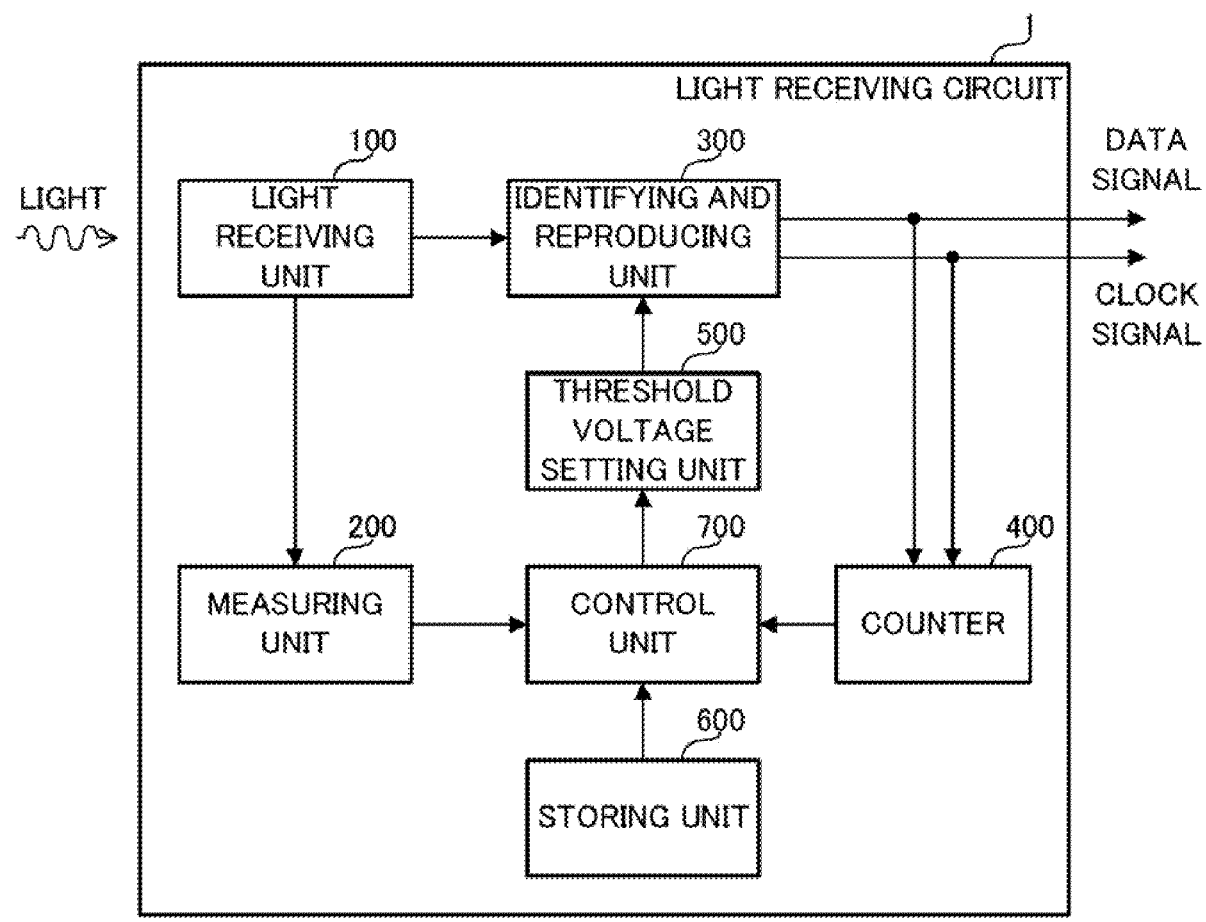
FIG. 1 is a diagram illustrating an example configuration of the light receiving circuit according to a first embodiment.

The text to follow explains embodiments of the present invention by referring to the drawings.

First Embodiment

A light receiving circuit 1 according to the first embodiment is explained below by referring to FIG. 1.

The light receiving circuit 1 includes a light receiving unit 100, a measuring unit 200, an identifying and reproducing unit 300, a counter 400, a threshold voltage setting unit 500, a storing unit 600, and a control unit 700.

The light receiving unit 100 detects an optical signal incident into the light receiving circuit 1, converts the optical signal into an electric signal, and supplies the converted electric signal to the measuring unit 200 and the identifying and reproducing unit 300.

The measuring unit 200 measures a specified physical quantity of the optical signal and supplies the measurement results to the control unit 700. The measuring unit 200 measures, e.g., the light intensity or wavelength dispersion of an optical signal.

The identifying and reproducing unit 300 identifies and reproduces a data signal and supplies the data signal to a counter 400 and external devices. The identifying and reproducing unit 300 performs the above identification and reproduction based on the electric signal supplied from the light receiving unit 100 as well as on the threshold voltage set by the threshold voltage setting unit 500.

The counter 400 counts the number of bits of each value (0 or 1) of the data thus identified and reproduced, calculates the ratio of the counts of the values, and supplies data on the ratio to the control unit 700.

Under control by the control unit 700, the threshold voltage setting unit 500 sets the threshold voltage, to which the identifying and reproducing unit 300 is currently set, to a specified threshold voltage.

The storing unit 600 stores a ratio optimum for measurements of the specified physical quantity of the optical signal taken by the measuring unit 200 (hereinafter referred to as the "optimum ratio"). The "optimum ratio" refers to the ratio of 1 data to 0 data at which the BER (Bit Error Rate) is the smallest. It can be regarded as the ratio of 1 data to 0 data at which the BER is reduced to a value small enough for practical purposes.

The control unit 700 reads out the optimum ratio from the storing unit 600 based on the measurement results supplied from the measuring unit 200. Then the control unit 700 controls the threshold voltage setting unit 500 and sets the identifying and reproducing unit 300 to a threshold voltage at which the ratio calculated by the counter 400 is the optimum ratio.

Second Embodiment

The first embodiment is explained above as a general embodiment in which the measuring unit 200 measures the specified physical quantity of an optical signal. In the second embodiment, a light receiving circuit 2 includes a light intensity measuring unit 210, which is used in place of the measuring unit 200, to measure the light intensity of an optical signal. By referring to FIGS. 2 to 4, the text to follow explains the second embodiment.

Figure 2:
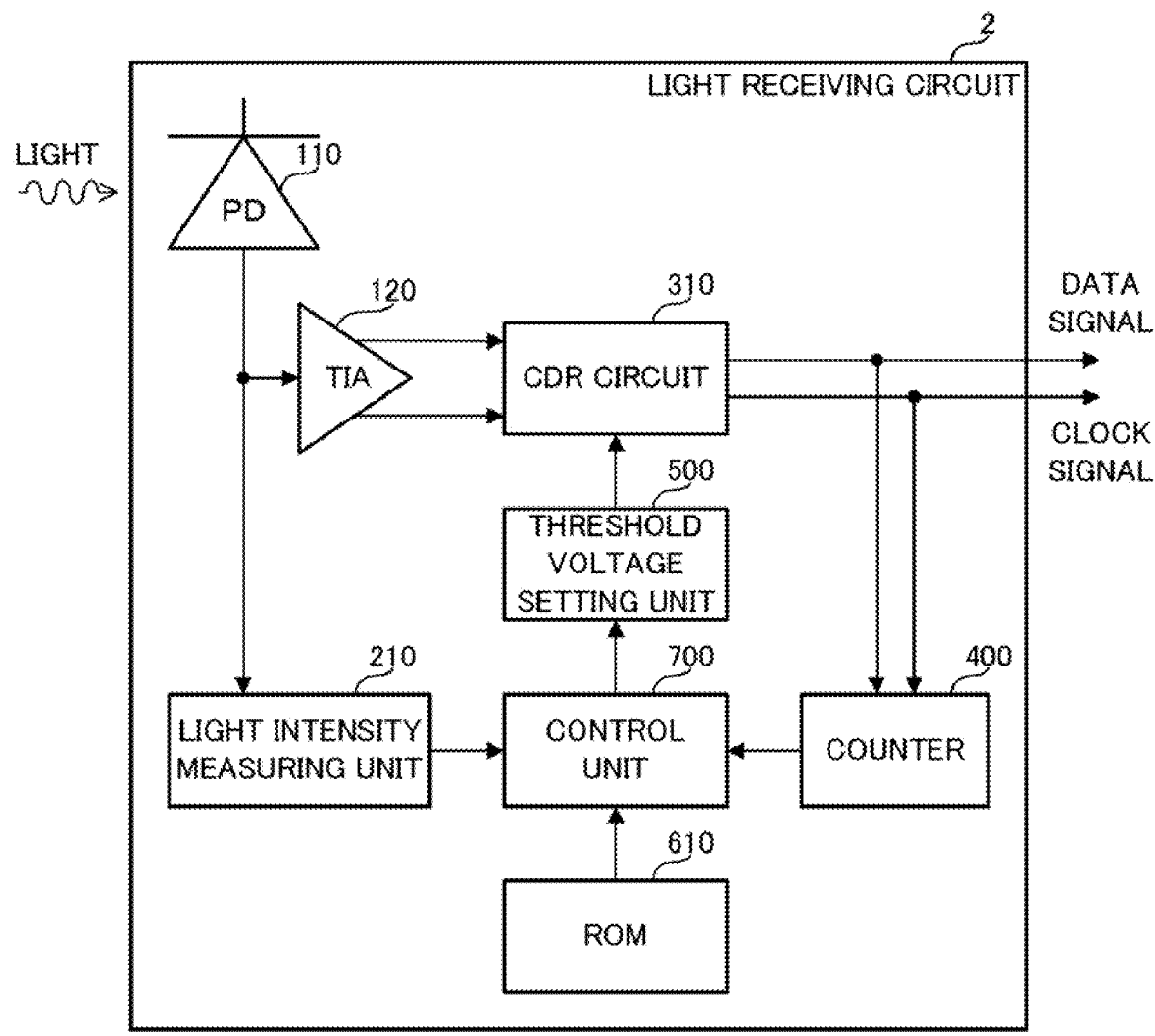
FIG. 2 is a diagram illustrating an example configuration of the light receiving circuit according to a second embodiment.

As shown in FIG. 2, the light receiving circuit 2 includes a PD (Photodiode) 110, a TIA (Trans-Impedance Amplifier) 120, the light intensity measuring unit 210, a CDR (Clock Data Recovery) circuit 310, the counter 400, the threshold voltage setting unit 500, a ROM (Read Only Memory) 610, and the control unit 700.

The PD 110 detects an optical signal incident into the light receiving circuit 2, converts the optical signal into an electrical signal, and supplies the converted electrical signals to the TIA 120 and the light intensity measuring unit 210.

The TIA 120 is an amplifier of trans-impedance type which converts a current signal supplied from the PD 110 into a voltage signal and supplies the converted voltage signal to the CDR circuit 310.

The CDR circuit 310 extracts a clock signal from a signal pulse train of the voltage signal supplied from the TIA 120. After the clock signal is extracted from the signal pulse train, the CDR circuit 310 determines the signal pulse amplitude as "0" for amplitude values smaller than the threshold voltage $V_0$ and as "1" for amplitude values greater than the threshold voltage $V_0$. Then the CDR circuit 310 presents the determination results and supplies the counter 400 and external devices with a data signal including 1 data and 0 data and the clock signal. In this fashion, the CDR circuit 310 reproduces a data signal and a clock signal based on the supplied signal.

The counter 400 counts the 1 data and 0 data indicated by the data signal supplied from the CDR circuit 310 and calculates the ratio of 0-data counts to 1-data counts. For example, the counter 400, at the rising edges of the clock signal supplied from the CDR circuit 310, samples the data signal supplied from the CDR circuit 310. Then the counter 400 divides the number of sampled 1 data counts by the number of sampled 0 data counts to calculate the ratio. For example, when the number of the 0 data counts is $10^6$ and the number of the 1 data counts is $2.5 \times 10^6$, the ratio calculated by the counter 400 is "2.5". The counter 400 in turn supplies the data on the ratio to the control unit 700.

Under control by the control unit 700, the threshold voltage setting unit 500 sets the threshold voltage $V_0$, to which the CDR circuit 310 is set, to a specified threshold voltage.

Figure 3A:
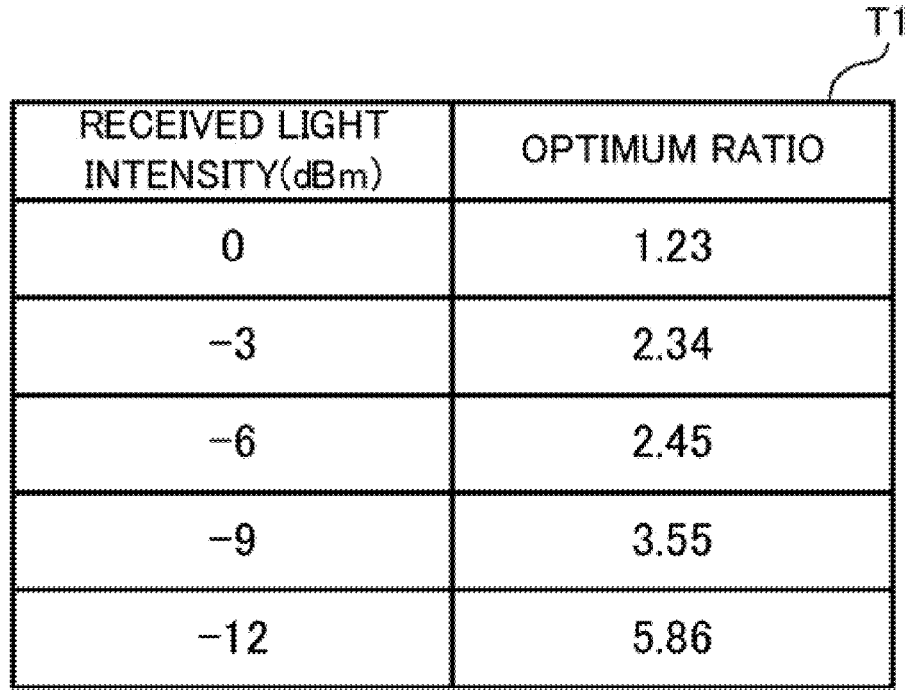
FIGS. 3A and 3B show tables presenting example data stored in a ROM (Read Only Memory) of the light receiving circuit according to the second embodiment.
Figure 3B:
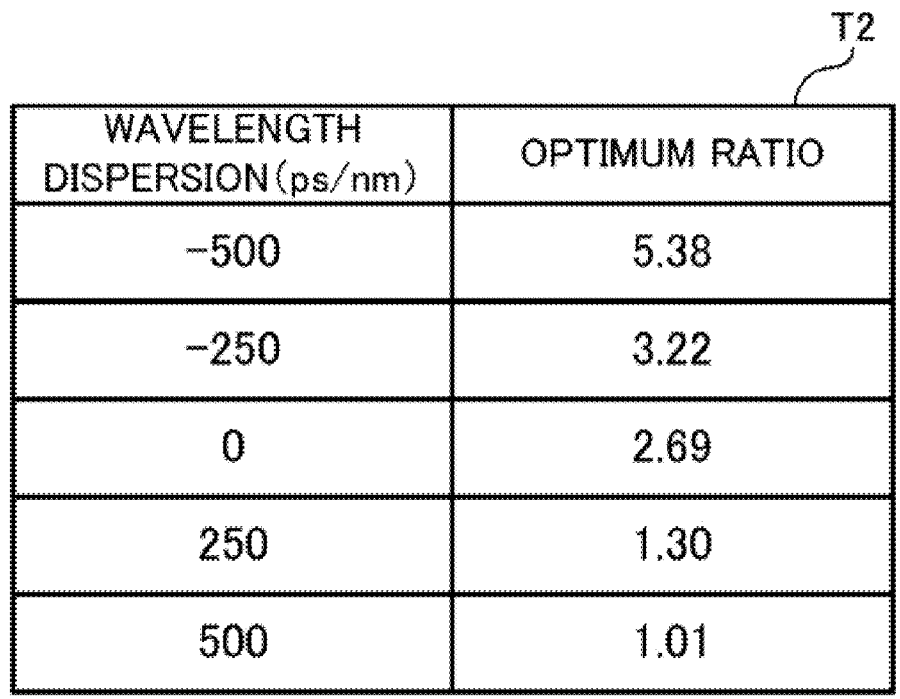

The ROM 610 stores program data of the process executed by the control unit 700 and the like. In particular, the ROM 610 stores the optimum ratio with respect to the light intensity of an optical signal. The "optimum ratio" refers to the ratio of 1 data to 0 data at the smallest BER, which can be regarded as the ratio where the BER is reduced to a value small enough for practical purposes. For example, the ROM 610 stores table T1, which presents light intensities, each of which is related to its corresponding optimum ratio (FIG. 3A). The ROM 610 also stores table T2, which presents wavelength dispersions, each of which is related to its corresponding optimum ratio (FIG. 3B).

The control unit 700, which includes a microprocessor, e.g., performs overall control of the light receiving circuit 2 according to a program stored in the ROM 610.

Figure 4:
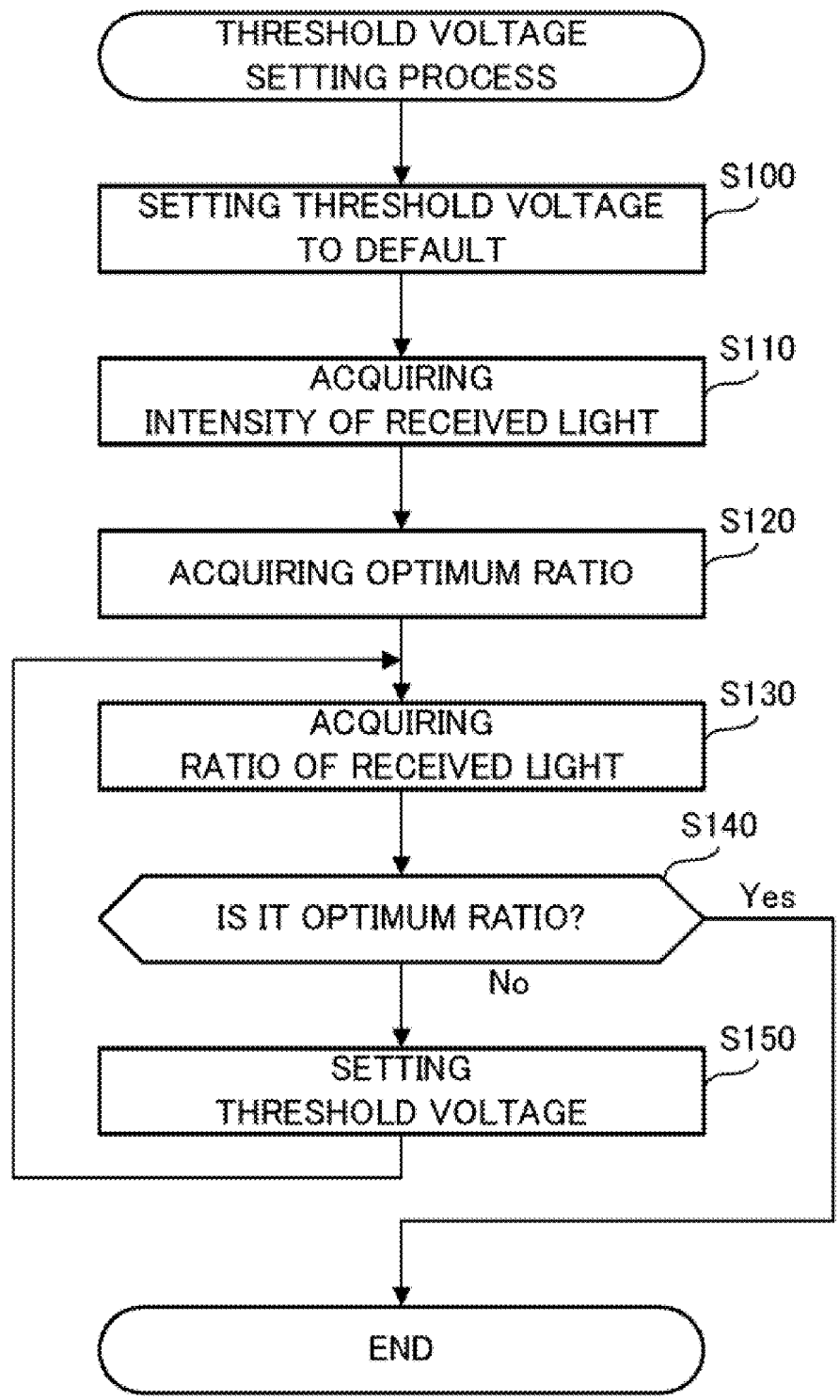
FIG. 4 is a flowchart of the threshold voltage setting process performed by the light receiving circuit according to the second embodiment.

The text to follow explains the operation of the light receiving circuit 2 by referring to the flowchart of FIG. 4.

Upon receipt of light incident into the light receiving circuit 2 via optical fibers or the like by the PD 110, the control unit 700 launches the threshold voltage setting process.

Firstly, the control unit 700 controls the threshold voltage setting unit 500 to set the threshold voltage of the CDR circuit 310 to a default value (step S100).

Next, the control unit 700 acquires light intensity data supplied from the light intensity measuring unit 210 (step S110).

The control unit 700 refers to the table T1 stored in the ROM 610 to acquire the optimum ratio corresponding to the light intensity acquired in step S110 (step S120).

Next the control unit 700 acquires data on the ratio of 1 data to 0 data supplied from the counter 400 (step S130).

The control unit 700 determines whether the optimum ratio acquired in step S120 differs from the ratio acquired in step S130 (step S140).

Upon determination that the optimum ratio is equal to the ratio acquired in step S130 (step S140; Yes), the control unit 700 ends the threshold voltage setting process. The control unit 700 may be set to determine that these two ratios are equal when the difference between the optimum ratio and the ratio acquired in step S130 is in a specified range.

Meanwhile, upon determination that the optimum ratio is different from the ratio acquired in step S130 (step S140; No), the control unit 700 controls the threshold voltage setting unit 500 so that the threshold voltage, to which the CDR circuit 310 is set, is set to a threshold voltage at which the ratio supplied from the counter 400 is the optimum ratio (step S150). A specific example is presented below. In this embodiment, the ratio supplied from the counter 400 is assumed to increase with an increase in the threshold voltage. Upon determination that the ratio supplied from the counter 400 is smaller than the optimum ratio, the control unit 700 raises the threshold voltage. Meanwhile, upon determination that the ratio supplied from the counter 400 is greater than the optimum ratio, the control unit 700 lowers the threshold voltage. In turn, the control unit 700 sends the process back to step S130. The control unit 700 repeats the process from steps S130 to S150 until the ratio of received light provided from the counter 400 reaches the optimum ratio.

Due to this threshold voltage setting process, the light receiving circuit 2 sets the identifying and reproducing circuit to a threshold voltage where the BER is reduced to a value small enough for practical purposes.

Third Embodiment

Figure 5A:
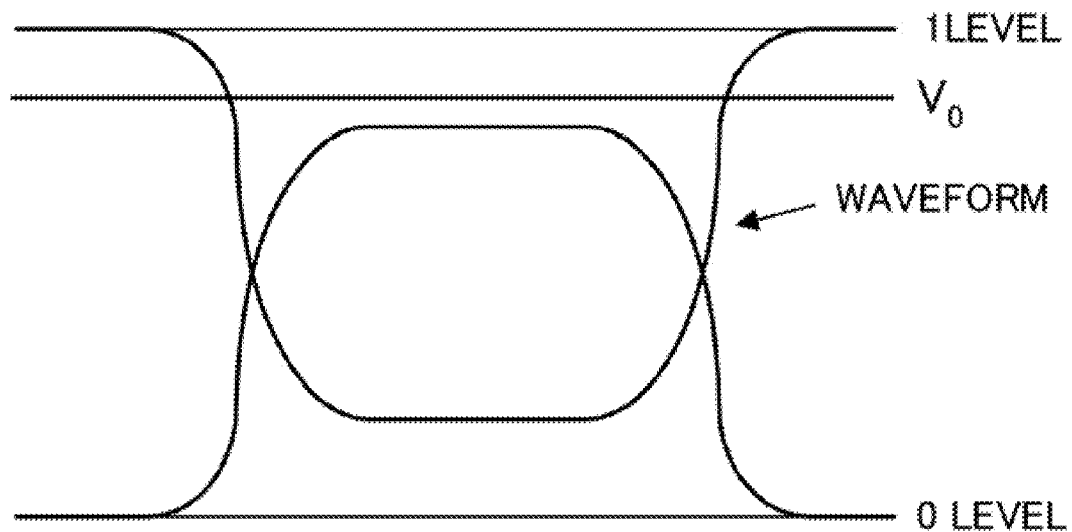
FIGS. 5A and 5B are diagrams illustrating the relationship between the threshold voltage and an eye pattern indicated by optical signals.

The CDR circuit 310 of the light receiving circuit according to the second embodiment identifies and reproduces all received data as 0 data, for example, under the signal waveform and threshold voltage conditions of FIG. 5A. Under the conditions of FIG. 5A, $V_0$, which is in the neighborhood of the 1 level, represents the threshold voltage. It is therefore necessary to prevent the threshold voltage from being set to a value in the neighborhood of the 0 or 1 level of the eye pattern.

Figure 5B:
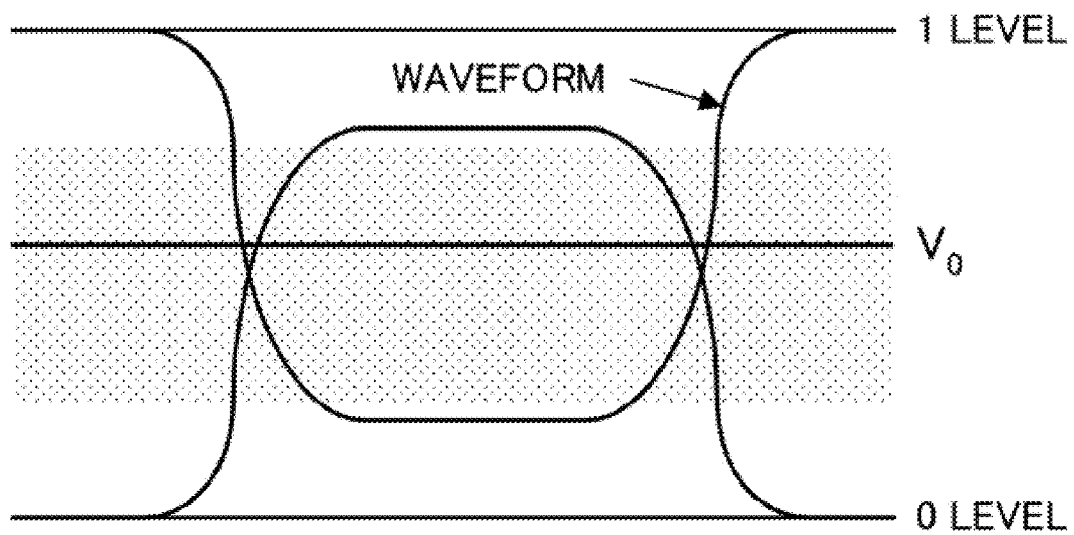
Figure 6:
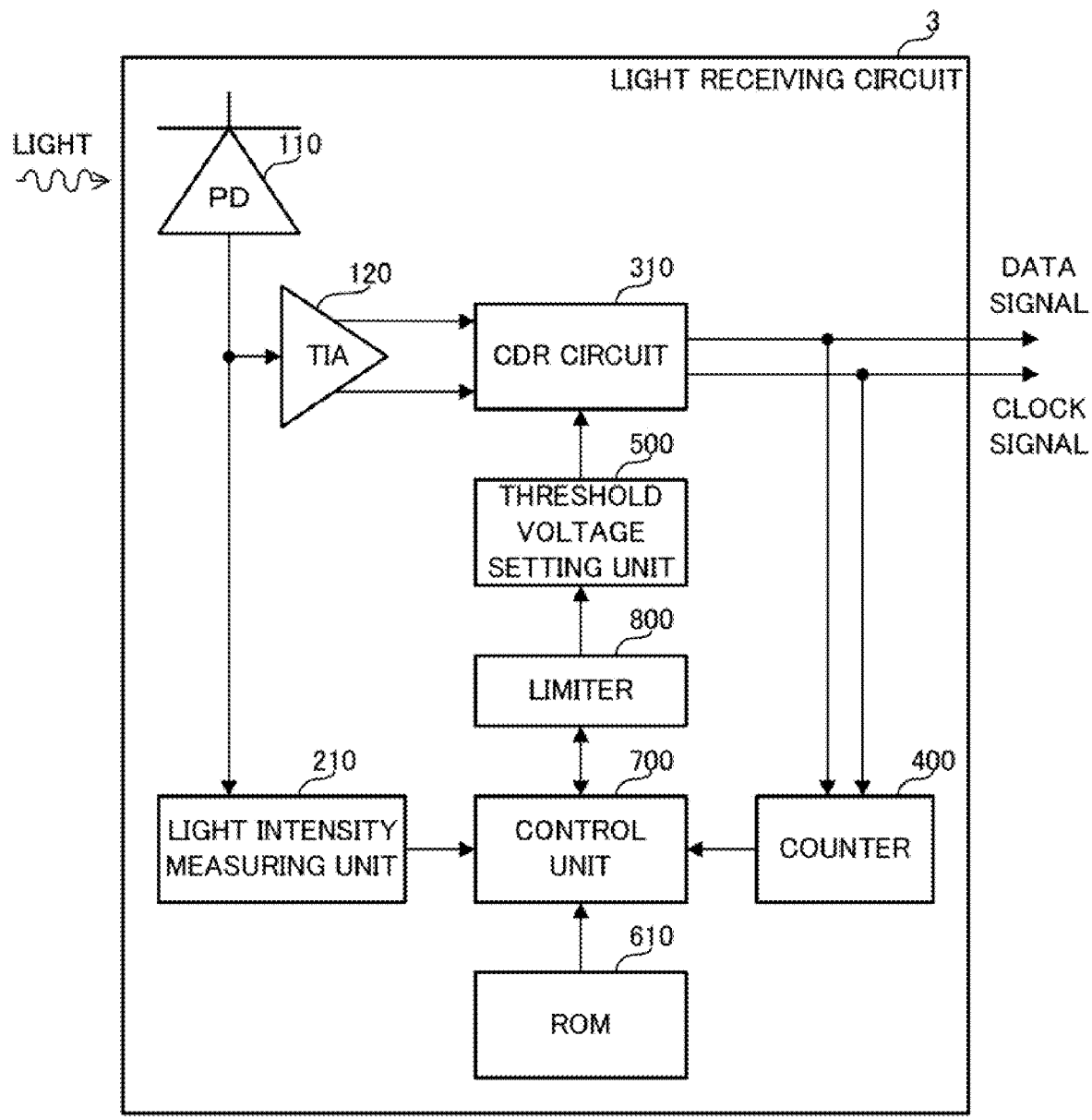
FIG. 6 is a diagram illustrating an example configuration of the light receiving circuit according to a third embodiment.

As shown in FIG. 6, a limiter 800, which limits the set range of the threshold voltage to a predetermined range, is added to the light receiving circuit 2. For example, the limiter 800 controls the threshold voltage setting unit 500 so that it can set the threshold voltage only in the range represented by the shaded area in FIG. 5B.

The limiter 800 is already set to a limit range within which the threshold voltage is limited. Upon acquisition of the set value of the threshold voltage supplied from the control unit 700, the limiter 800 determines whether the set value is within the limit range. Upon determination that the acquired set value is within the limit range, the limiter 800 supplies the set value to the threshold voltage setting unit 500. Meanwhile, upon determination that the acquired set value is out of the limit range, the limiter 800 informs the control unit 700 to that effect.

Figure 7:
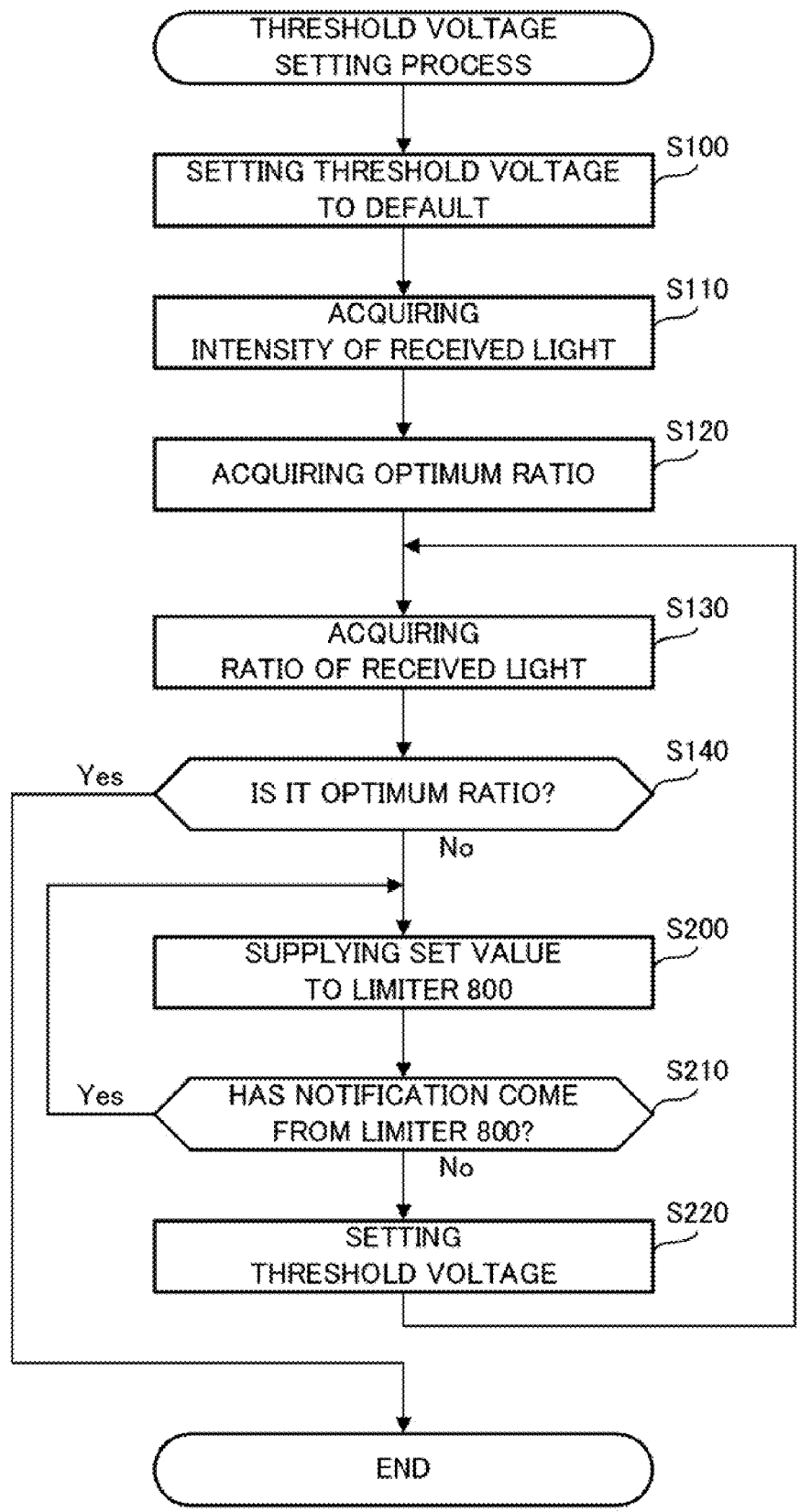
FIG. 7 is a flowchart of the threshold voltage setting process performed by the light receiving circuit according to the third embodiment.

Next, the operation of a light receiving circuit 3 is explained by referring to the flowchart of FIG. 7.

Upon receipt of light incident into the light receiving circuit 3 via optical fibers or the like by the PD 110, the control unit 700 launches the threshold voltage setting process.

Firstly, the control unit 700 executes the process in steps S100 to S140 in the flowchart of FIG. 7.

Upon determination that the optimum ratio is equal to the ratio acquired in step S130 (step S140; Yes), the control unit 700 ends the threshold voltage setting process.

Meanwhile, upon determination that the optimum ratio is different from the ratio acquired in step S130 (step S140; No), the control unit 700 supplies the set value of the threshold voltage to the limiter 800 (step S200).

Next, the control unit 700 determines whether the limiter 800 has supplied the control unit 700 with a notification that the set value supplied to the limiter 800 is out of the predetermined limit range of the limiter 800 (step S210).

Upon determination that the foregoing notification has been supplied from the limiter 800 (step S210; Yes), the control unit 700 sends the process back to step S200 and supplies the limiter 800 with a set value that is different from the one previously supplied to the limiter 800 (step S200). Therefore, the control unit 700 repeats the process of step S200 to step S210 until the set value falls within the predetermined limit range of the limiter 800.

Meanwhile, upon determination that the foregoing notification has not been supplied from the limiter 800 (step S210; No), the control unit 700 sets the threshold voltage to the set value supplied to the limiter 800 (step S220) and sends the process back to step S130. Therefore, the control unit 700 repeats the process of steps S130 to S220 until the ratio acquired in step S130 becomes the optimum ratio.

Due to this threshold voltage setting process, the light receiving circuit 3 can prevent the threshold voltage from being set to a value in the neighborhood of the 0 or 1 level of the eye pattern. The light receiving circuit 3 can prevent all received data from being identified and reproduced as 1 data only or 0 data only.

Fourth Embodiment

The light receiving circuits according to the first to third embodiments can, by changing the threshold voltage of the identifying and reproducing circuit, reduce the BER to a value small enough for practical purposes. However, in some cases, the BER changes significantly when the threshold voltage changes.

Figure 8:
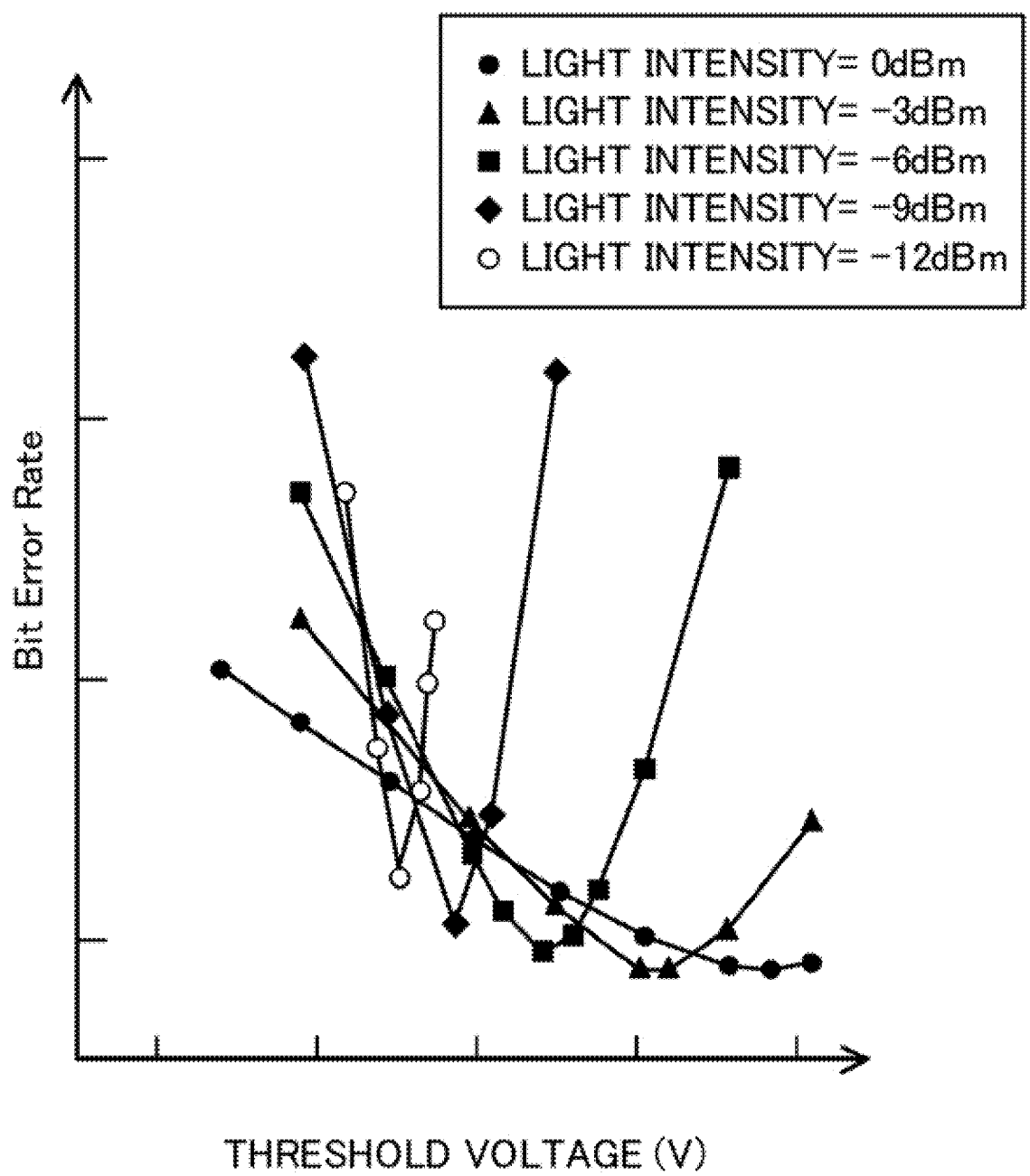
FIG. 8 is a diagram illustrating the relationship between light intensity and BER.

For example, FIG. 8 illustrates the behavior of the BER with respect to the threshold voltage. The steepness of the curves of the BER increases as the light intensity decreases. The curve represented by white circles, whose light intensity is −12 dBm and is the smallest of the curves in FIG. 8, shows that the BER rapidly increases or decreases only with a slight change in the threshold voltage.

Figure 9:
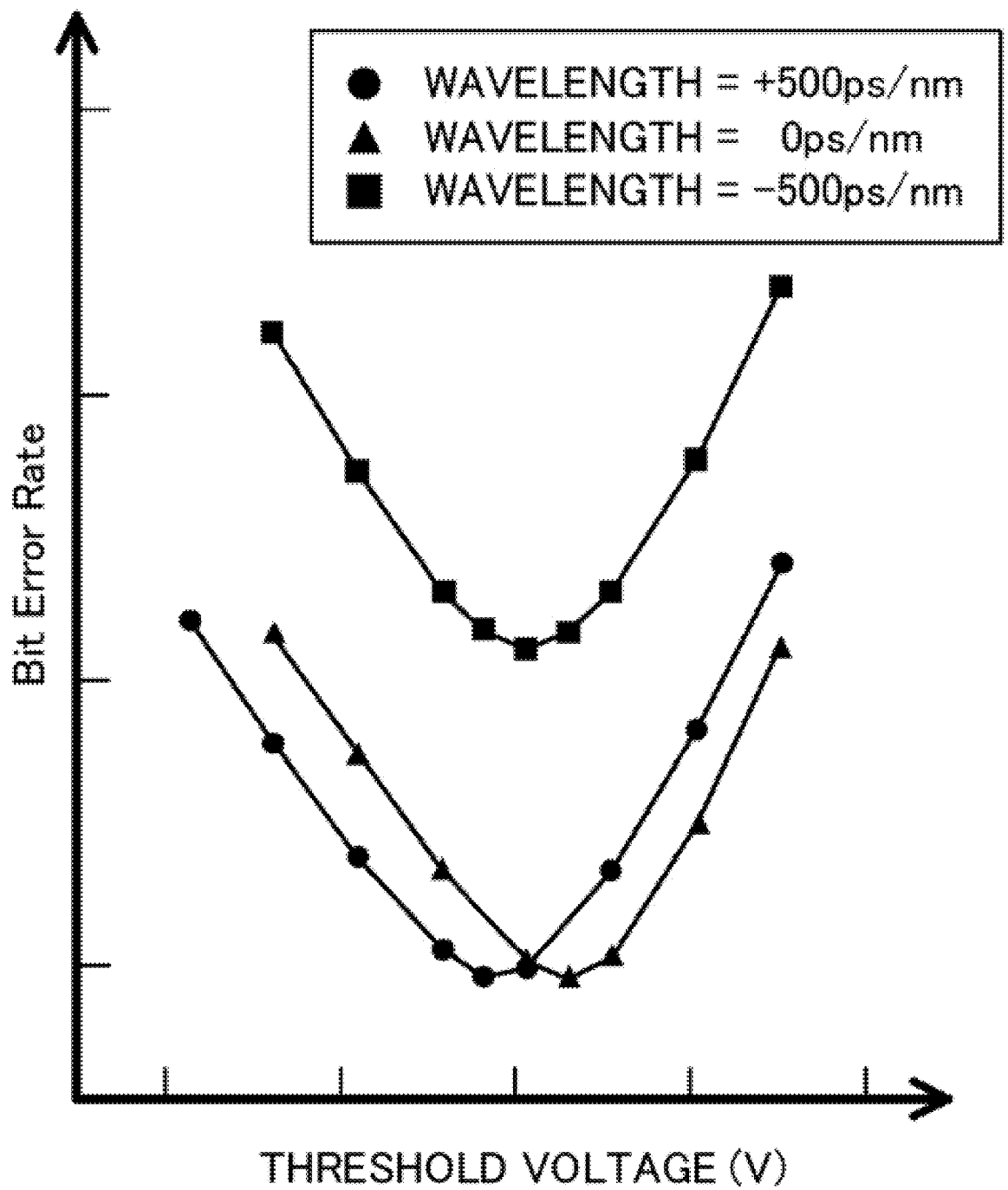
FIG. 9 is a diagram illustrating the relationship between light wavelength dispersion and BER.

This kind of behavior of the BER is apparent, not only when the light intensity of an optical signal changes, but also when the wavelength dispersion of an optical signal changes as shown in FIG. 9.

Therefore, the range where the threshold voltage can be set must be changed according to changes in the light intensity or the like of an optical signal.

Figure 10:
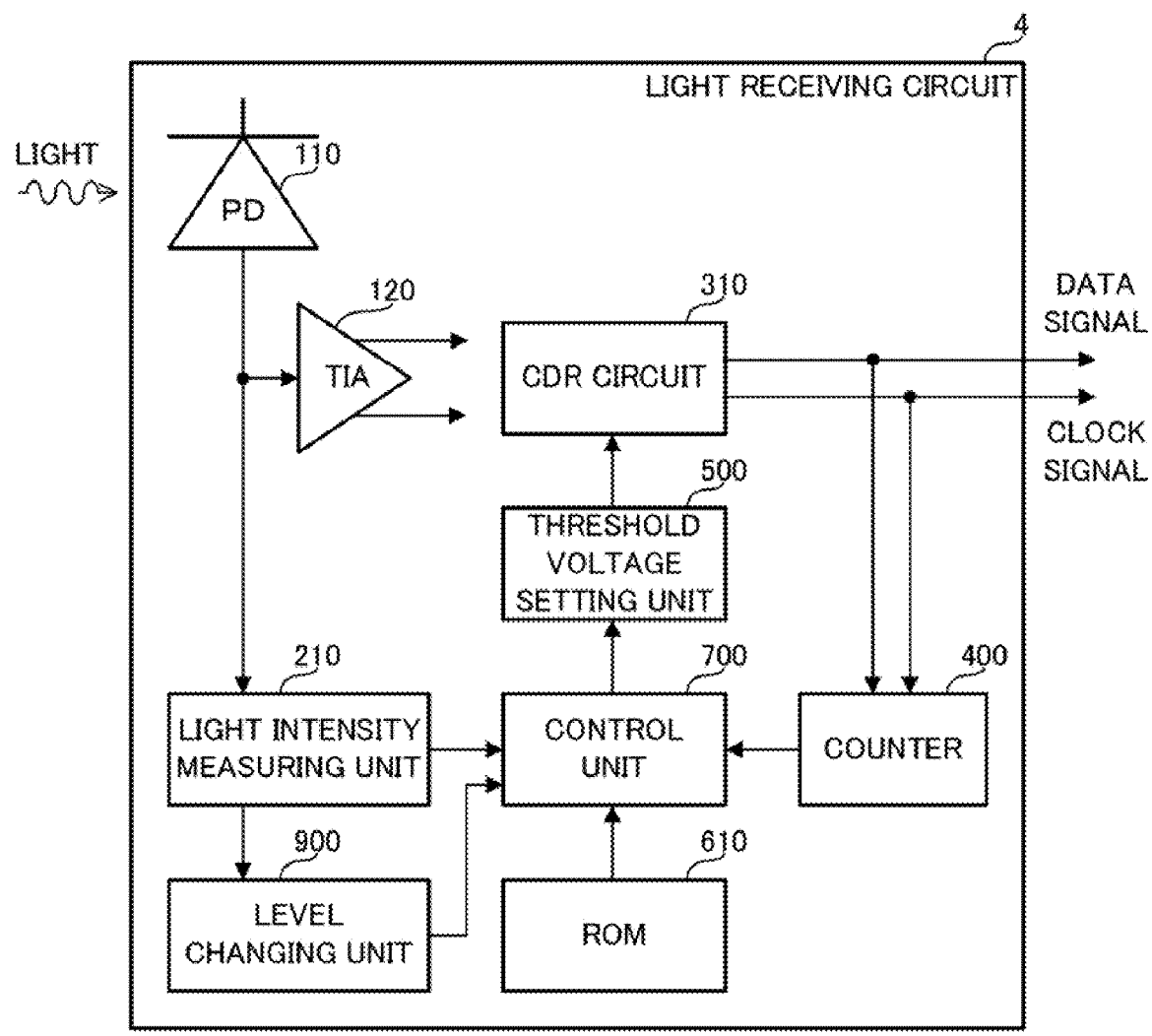
FIG. 10 is a diagram illustrating an example configuration of the light receiving circuit according to a fourth embodiment.

As shown in FIG. 10, the level changing unit 900 is added to the light receiving circuit 2.

Figure 11:
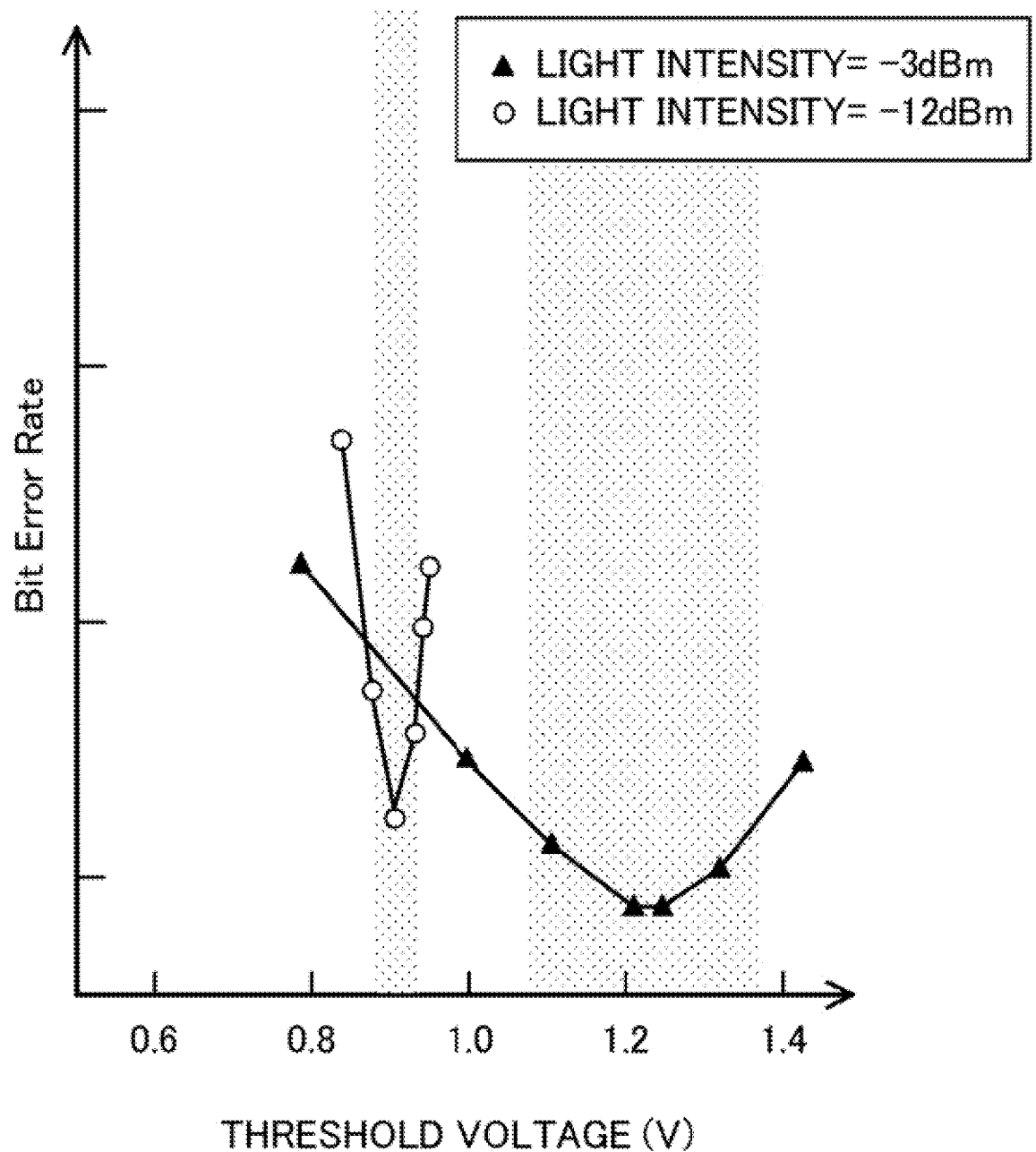
FIG. 11 is a diagram illustrating the relationship between light intensity and BER.

The level changing unit 900 is connected to the light intensity measuring unit 210 and the control unit 700. Upon acquisition of light intensity data supplied from the light intensity measuring unit 210, the level changing unit 900 determines the set range of the threshold voltage according to the light intensity. Then the level changing unit 900 supplies data on the set range to the control unit 700. For example, FIG. 11 presents the behavior of the BER with respect to the threshold voltage. In this case, the level changing unit 900 set the set range to 0.87 V to 0.92 V at a light intensity of −12 dBm as well as to 1.10 V to 1.35 V at a light intensity of −3 dBm.

Figure 12:
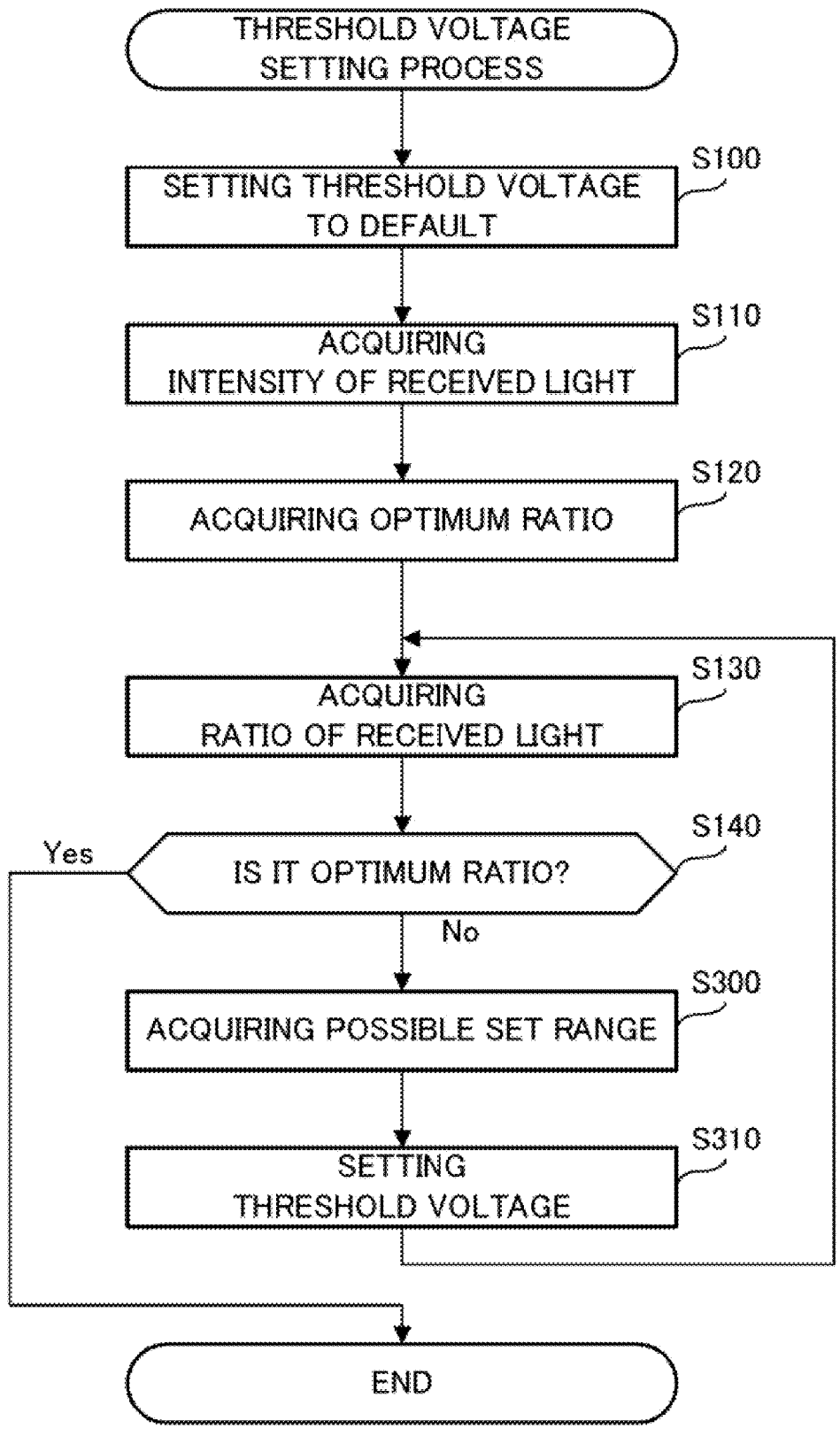
FIG. 12 is a flowchart of the threshold voltage setting process performed by the light receiving circuit according to the fourth embodiment.

The text to follow explains the operation of the light receiving circuit 4 by referring to the flowchart of FIG. 12.

Upon detection of light incident into the light receiving circuit 4 via optical fibers or the like by the PD 110, the control unit 700 launches the threshold voltage setting process.

Firstly, the control unit 700 executes the process in steps S100 to S140 in the flowchart of FIG. 12.

Upon determination that the optimum ratio is equal to the ratio acquired in step S130 (step S140; Yes), the control unit 700 ends the threshold voltage setting process.

Meanwhile, upon determination that the optimum ratio is different from the ratio acquired in step S130 (step S140; No), the control unit 700 acquires the set range of the threshold voltage from the level changing unit 900 (step S300).

Next, the control unit 700 supplies the threshold voltage setting unit 500 with the set value in the set range acquired in step S300, sets the threshold voltage of the CDR circuit 310 (step S310), and sends the process back to step S130. Therefore, the control unit 700 repeats the setting process of the threshold voltage until the BER is reduced to a value small enough for practical purposes.

Due to this threshold voltage setting process, the light receiving circuit 4 can change, in response to changes in the light intensity or the like of an optical signal, the range within which the threshold voltage can be set.

Fifth Embodiment

In some cases, the set range of the threshold voltage of the light receiving circuit 4 according to the fourth embodiment includes ranges in the neighborhood of the 0 or 1 level. In response, the limiter 800 may be added to the light receiving circuit 4.

Figure 13:
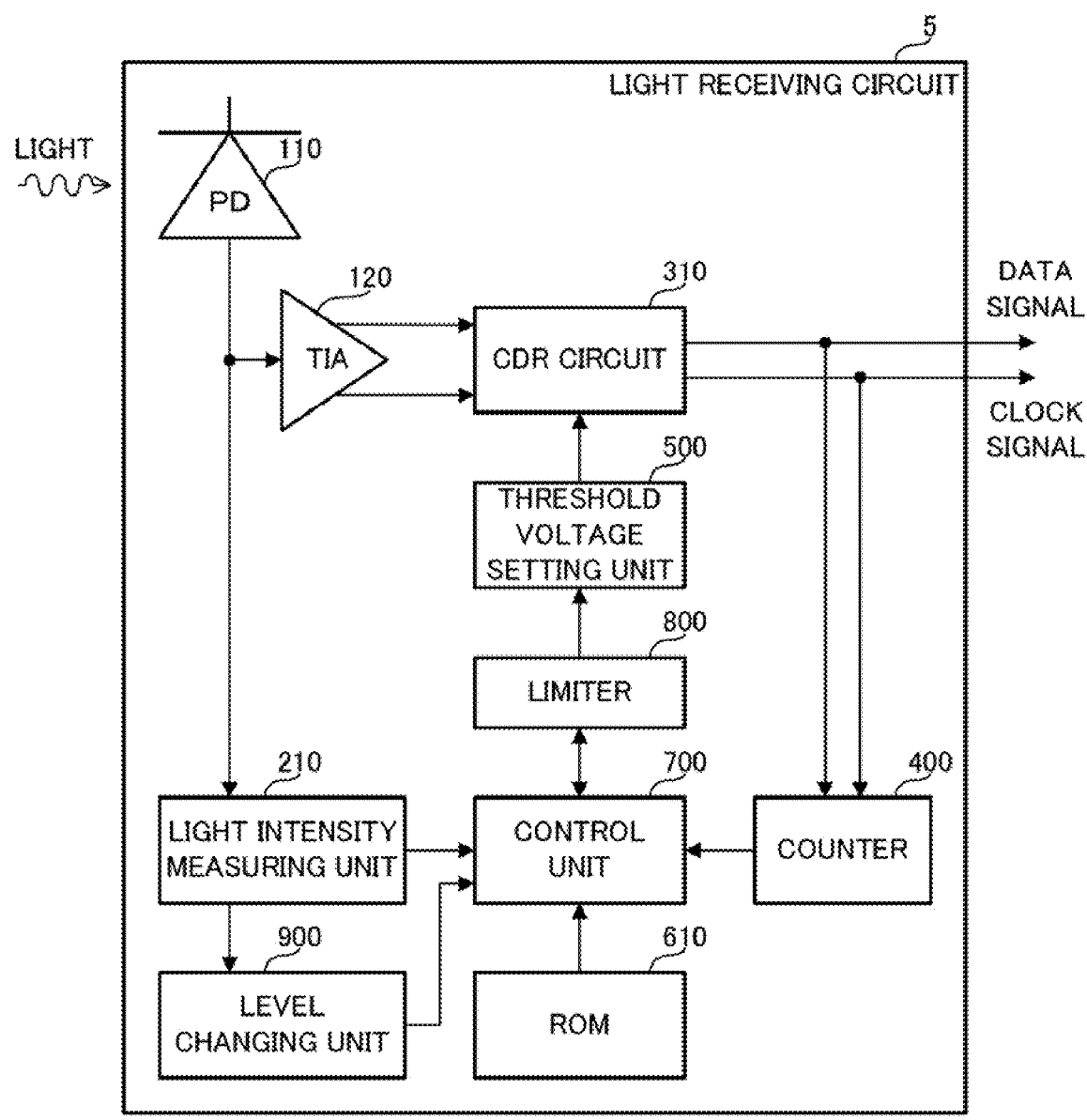
FIG. 13 is a diagram illustrating an example configuration of the light receiving circuit according to a fifth embodiment.

As illustrated in FIG. 13, a light receiving circuit 5 according to this embodiment is equal to the light receiving circuit 4 added with the limiter 800.

The limiter 800 and the level changing unit 900 are identical to the ones provided on the light receiving circuit 3 and the light receiving circuit 4, respectively.

Figure 14:
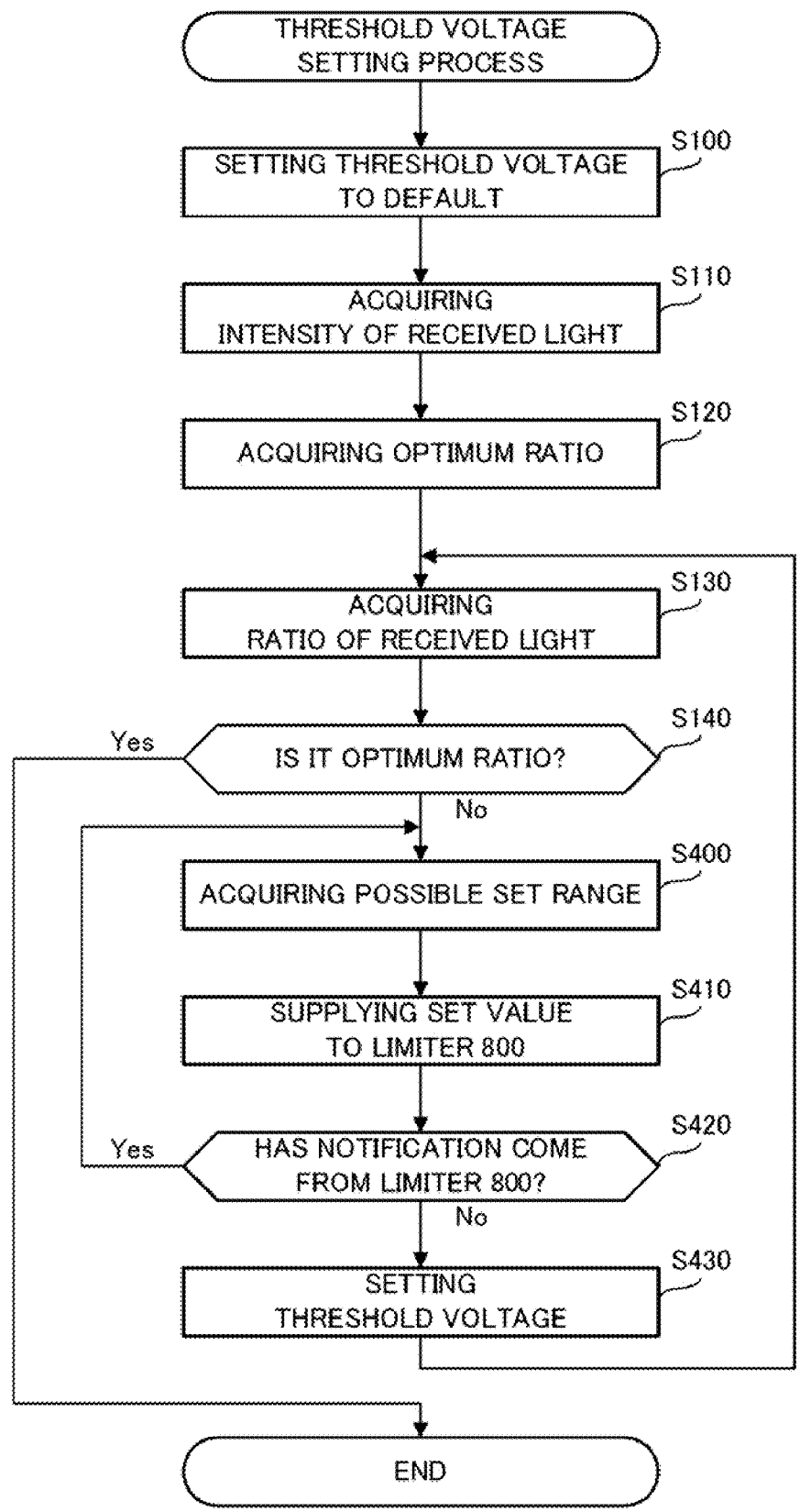
FIG. 14 is a flowchart of the threshold voltage setting process performed by the light receiving circuit according to the fifth embodiment.

The text to follow explains the operation of the light receiving circuit 5 by referring to the flowchart of FIG. 14.

Upon receipt of light incident into the light receiving circuit 5 via optical fibers or the like by the PD 110, the control unit 700 launches the threshold voltage setting process.

Firstly, the control unit 700 executes the process in steps S100 to S140 in the flowchart of FIG. 14.

Upon determination that the optimum ratio is equal to the ratio acquired in step S130 (step S140; Yes), the control unit 700 ends the threshold voltage setting process.

Meanwhile, upon determination that the optimum ratio is different from the ratio acquired in step S130 (step S140; No), the control unit 700 acquires the set range of the threshold voltage from the level changing unit 900 (step S400).

The control unit 700 supplies the limiter 800 with the set value within the set range acquired in step S400 (step S410).

Next, the control unit 700 determines whether the limiter 800 has supplied the control unit 700 with a notification that the set value supplied to the limiter 800 is out of the predetermined limit range of the limiter 800.

Upon determination that the foregoing notification has been supplied from the limiter 800 (step S420; Yes), the control unit 700 sends the process back to step S400. Therefore, the control unit 700 repeats the process of steps S400 to S420 until the foregoing notification is no longer supplied from the limiter 800.

Upon determination that the notification has not been supplied from the limiter 800 (step S420; No), the control unit 700 sets the threshold voltage of the CDR circuit 310 to the set value (step S430) and sends to process back to step S130. Therefore, the control unit 700 repeats the setting process of the threshold voltage until the BER is reduced to a value small enough for practical purposes.

Due to this threshold voltage setting process, the light receiving circuit 5 can make the threshold voltage consistent with the intensity of received light and prevent the threshold voltage from being set to a value in the neighborhood of the 0 or 1 level of the eye pattern.

The above text has explained the embodiments in which a light intensity measuring unit for measuring the light intensity is included, but the present invention is not limited thereto. For example, a wavelength dispersion measuring unit for measuring the wavelength dispersion of light may be included.

Figure 15:
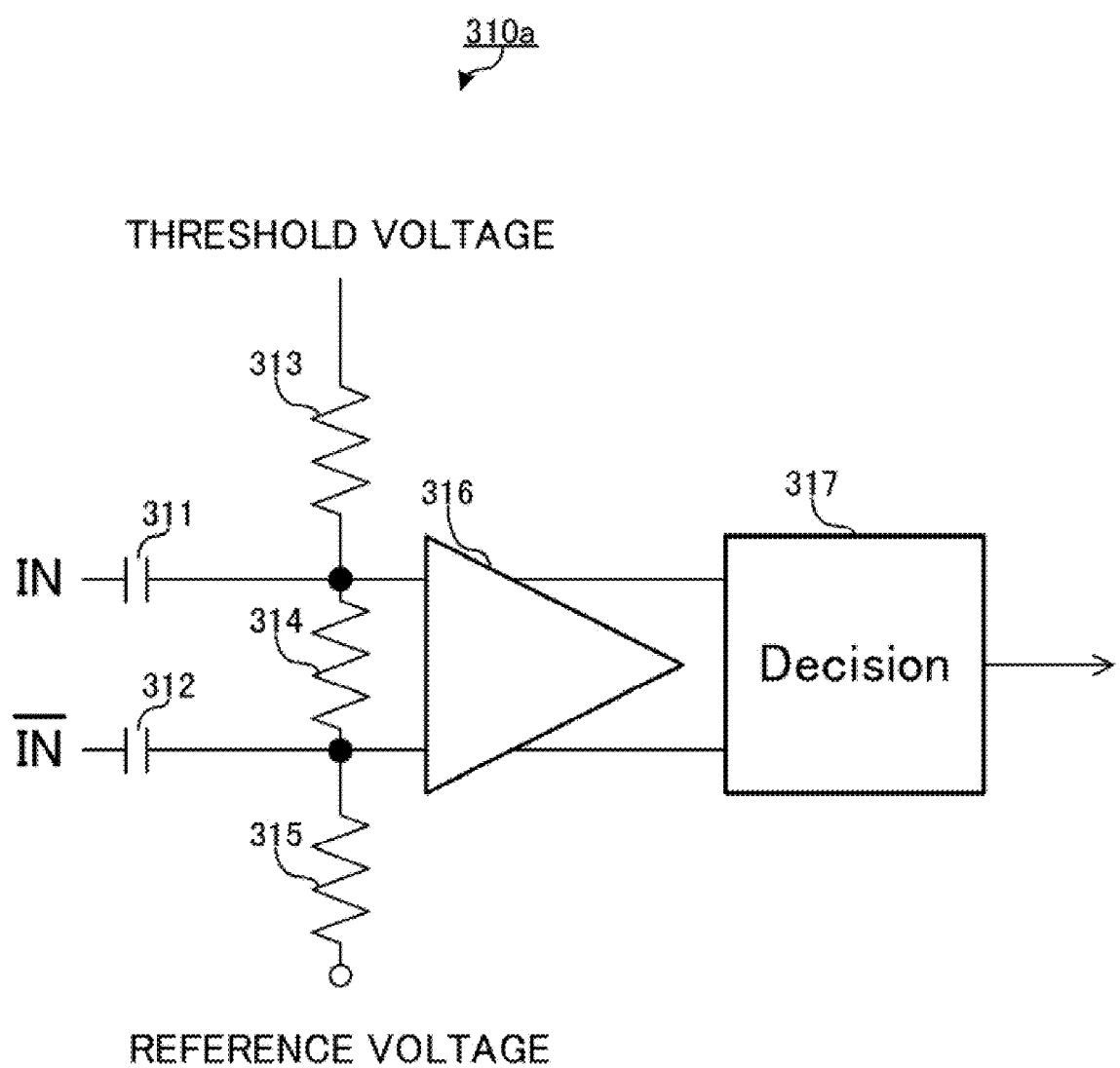
FIG. 15 is a diagram illustrating an example configuration of an input circuit of a CDR (Clock Data Recovery) circuit.

As a method of setting the threshold voltage, e.g., the circuit 310a shown in FIG. 15 may be provided on the input circuit of the CDR circuit 310. When the threshold voltage is set by the threshold voltage setting unit 500, offset adjustment is made using direct voltage to change the set threshold voltage on the circuit 310a. Resistance division for the set threshold voltage is performed on the circuit 310a to supply the offset voltage. The reference voltage is a voltage set for the threshold voltage. It adds amplitude to the threshold voltage. The capacitors 311, 312 are used for AC coupling of an input signal. The resistors 313 to 315 are for voltage division. The amplifier 316 amplifies and outputs the supplied voltage. The determining unit 317 determines whether the amplified voltage is 1 data or 0 data.

To explain the above embodiments, examples of setting the threshold voltage were presented. In the examples, a table referred to for such setting stores the specified physical quantity (light intensity or wavelength dispersion) of an optical signal and the optimum ratio corresponding thereto. However, the present invention is applicable to an embodiment in which acquisition of the optimum ratio corresponding to the specified physical quantity is possible when the quantity is acquired. In such an embodiment, e.g., an approximate equation representing the relationship between the specified physical quantity and the optimum ratio may be stored in the ROM 610 or the like.

In examples presented to explain the above embodiments, the threshold voltage is set to change when the ratio acquired by the counter 400 differs from the optimum ratio. However, the threshold voltage may be set to change when the difference between the ratio acquired by the counter 400 and the optimum ratio is greater than a specified value.

In examples to explain the above embodiments, the threshold voltage is set according to the optimum ratio corresponding to one physical quantity (either light intensity or wavelength dispersion). However, the threshold voltage may be set according to the optimum ratio corresponding to a plurality of physical quantities. In such a setting, for example, a wavelength dispersion measuring unit is added to the light receiving circuit 2 shown in FIG. 2 so as to acquire the wavelength dispersion in addition to the light intensity. The ROM 610 stores the light intensity and the wavelength dispersion, as well as their corresponding ratio that should be calculated when the BER of a generated data signal is the smallest. At the light intensity acquired by the light intensity measuring unit 210 and the wavelength dispersion obtained by the wavelength dispersion measuring unit, the ratio to be calculated at the smallest BER is acquired. Then the threshold voltage is set so that the ratio thus acquired is equal to the ratio calculated by the counter 400.

The foregoing hardware configurations and flowcharts are just other examples and can be changed and modified arbitrarily. The central part of the control process for the light receiving circuit 2, which includes the control unit 700, etc., may be set to be performed by an ordinary computer system instead of a dedicated system. For example, a program for executing the process illustrated by the flowchart in FIG. 4 may be stored in a computer-readable storage medium (such as an IC memory, a magnetic recording disk, a magnetic recording card, an optical recording disk, an optical recording card, a magnetic optical recording disk, and a magnetic optical recording card) for distribution. The computer program may be thereby installed on a computer, and this process may be executed by the computer installed with the program. Also, the computer program may be stored in a storage device included in a server device on the communication network, such as the Internet, to allow an ordinary computer system to download the program, so that the process can be executed by the ordinary computer system.

Only the application program may be stored in a storage medium or storage device when the feature of the control unit 700 according to the present invention is achieved by either cooperative or separate use of the application program and the OS (operating system).

The computer program may be superimposed on carrier waves for distribution via communication network. For example, the computer program may be posted on the bulletin board of the communication network for distribution of the computer program. The foregoing process may also be set to be executed by launching this computer program under the control of the OS, as in the manner that other applications are executed.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A light receiving circuit comprising:
   a converting unit that converts an optical signal into an electric signal;
   a measuring unit that measures a specified physical quantity of the optical signal;
   a generating unit that binarizes a signal level of the electrical signal into a first value or a second value based on a specified threshold and generates a data signal that indicates a binarized value;
   a ratio acquiring unit that calculates a ratio of a period in which the first value is indicated by the data signal generated by the generating unit to a period in which the second value is indicated thereby;
   a threshold setting unit that sets the threshold;
   a storing unit that in advance stores information on a relationship among the physical quantity measured by the measuring unit, the ratio calculated by the ratio acquiring unit, and a bit error rate of the data signal generated by the generating unit; and
   a control unit that controls the threshold setting unit to change the threshold based on the information stored in the storing unit, the physical quantity measured by the measuring unit, and the ratio calculated by the ratio acquiring unit so that the bit error rate of the data signal generated by the generating unit is low.

2. The light receiving circuit according to claim 1:
   wherein the information stored in the storing unit indicates a relationship between the physical quantity measured by the measuring unit and a ratio that should be calculated by the ratio acquiring unit at a smallest bit error rate of the data signal generated by the generating unit under conditions where the physical quantity is measured by the measuring unit; and
   the control unit calculates, based on the information stored in the storing unit and the physical quantity measured by the measuring unit, one ratio that should be calculated by the ratio acquiring unit at the smallest bit error rate of the data signal generated by the generating unit under the conditions where the physical quantity is measured by the measuring unit and causes the threshold setting unit to change the threshold so that another ratio calculated by the ratio acquiring unit is equal to the one ratio.

3. The light receiving circuit according to claim 1 further comprising:
   a range setting unit that sets a range within which the specified threshold can be set,
   wherein the control unit causes the threshold setting unit to change the threshold within the range set by the range setting unit.

4. The light receiving circuit according to claim 3,
   wherein the range setting unit sets the range according the physical quantity measured by the measuring unit.

5. The light receiving circuit according to claim 1,
   wherein the physical quantity is light intensity or wavelength dispersion.

6. The light receiving circuit according to claim 1,
   wherein the measuring unit measures a plurality of physical quantities of the optical signal;
   the storing unit in advance stores information on a relationship among the plurality of physical quantities measured by the measuring unit, the ratio calculated by the ratio acquiring unit, and the bit error rate of the data signal generated by the generating unit; and
   the control unit, based on the information stored in the storing unit, the plurality of physical quantities measured by the measuring unit, and the ratio calculated by the ratio acquiring unit, causes the threshold setting unit to change the threshold so that the bit error rate of the data signal generated by the generating unit is low.

7. The light receiving circuit according to claim 1,
   wherein the converting unit comprises a photodiode.

8. The light receiving circuit according to claim 1,
   wherein the generating unit comprises a clock data recovery circuit.

9. The light receiving circuit according to claim 1,
   wherein the ratio acquiring unit samples the data signal generated by the generating unit at a specified sampling frequency for a specified time period, counts how many data are sampled for each of the first value and the second value, and calculates the ratio of the counts of the two values.

10. A light receiving circuit comprising:
    converting means that converts an optical signal into an electric signal;
    measuring means that measures a specified physical quantity of the optical signal;

generating means that binarizes a signal level of the electrical signal into a first value or a second value based on a specified threshold and generates a data signal that indicates a binarized value;

ratio acquiring means that calculates a ratio of a period in which the first value is indicated by the data signal generated by the generating means to a period in which the second value is indicated thereby;

threshold setting means that sets the threshold;

storing means that in advance stores information on a relationship among the physical quantity measured by the measuring means, the ratio calculated by the ratio acquisition means, and a bit error rate of the data signal generated by the generating means; and control means that controls the threshold setting means to change the threshold based on the information stored in the storing means, the physical quantity measured by the measuring means, and the ratio calculated by the ratio acquiring means so that the bit error rate of the data signal generated by the generating means is low.

11. A light receiving method performed by a light receiving circuit comprising a converting unit, a measuring unit, a generating unit, a ratio acquiring unit, a threshold setting unit, a storing unit, and a control unit, the storing unit in advance storing information on a relationship among a physical quantity measured by the measuring unit, a ratio calculated by the ratio acquiring unit, and a bit error rate of a data signal generated by the generating unit, the method comprising:

a converting step of, by the converting unit, converting an optical signal into an electric signal;

a measuring step of, by the measuring unit, measuring the specified physical quantity of the optical signal;

a generating step of, by the generating unit, binarizing a signal level of the electrical signal into a first value or a second value based on a specified threshold and generating a data signal that indicates a binarized value;

a ratio acquiring step of, by the ratio acquiring unit, calculating a ratio of a period in which the first value is indicated by the data signal generated by the generating unit to a period in which the second value is indicated thereby;

a threshold setting step of, by the threshold setting unit, setting the threshold; and a controlling step of, by the control unit, controlling the threshold setting unit to change the threshold based on the information stored in the storing unit, the physical quantity measured by the measuring unit, and the ratio calculated by the ratio acquiring unit so that the bit error rate of the data signal generated by the generating unit is low.

12. A storage medium storing a program that causes a computer to act as a light receiving circuit, the light receiving circuit comprising:

a converting unit that converts an optical signal into an electric signal;

a measuring unit that measures a specified physical quantity of the optical signal;

a generating unit that binarizes a signal level of the electrical signal into a first value or a second value based on a specified threshold and generates a data signal that indicates a binarized value;

a ratio acquiring unit that calculates a ratio of a period in which the first value is indicated by the data signal generated by the generating unit to a period in which the second value is indicated thereby;

a threshold setting unit that sets the threshold;

a storing unit that in advance stores information on a relationship among the physical quantity measured by the measuring unit, the ratio calculated by the ratio acquiring unit, and a bit error rate of the data signal generated by the generating unit; and a control unit that controls the threshold setting unit to change the threshold based on the information stored in the storing unit, the physical quantity measured by the measuring unit, and the ratio calculated by the ratio acquiring unit so that the bit error rate of the data signal generated by the generating unit is low.

* * * * *